April 7, 1942.  J. LOISELEUR  2,278,722
METALLIC COATING
Filed Feb. 23, 1937
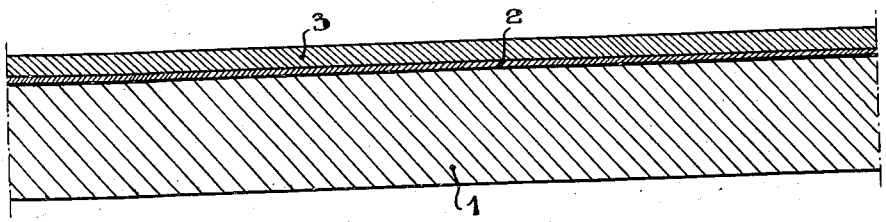
INVENTOR,
Jean Loiseleur
By [signature]
Attorneys.

Patented Apr. 7, 1942

2,278,722

UNITED STATES PATENT OFFICE 2,278,722

METALLIC COATING

Jean Loiseleur, Paris, France, assignor to Societe Anonyme des Manufactures des Glaces & Produits Chimiques de Saint Gobain, Chauny & Cirey, Paris, France Application February 23, 1937, Serial No. 127,285
In France October 21, 1936

2 Claims. (Cl. 91—68.3)

The present invention concerns a method for obtaining, through a wet method and in the absence of an external electric source, a very adhesive deposit of a metal the electrolytic potential of which is positive in respect of the hydrogen electrode (such as mercury, bismuth, gold, silver, copper, antimony, rhodium, palladium, osmium, platinum, etc.) upon surfaces such that, on the one hand, of a polished metal, or, on the other hand, glass, ceramic metals, mica, or again, sheets, thin bands, films and threads of cellulose, cellulosic esters and other derivatives of cellulose, polymerized resins, varnishes, gums, rubber, ebonite, or any other organic plastic matter of different nature, consisting chiefly of urea, acetals, formaldehyde compounds, phenol compounds, Bakelites, albuminous compounds, such as leather, ordinary or tanned gelatine, casein, or any other albuminoid.

The method according to the present invention includes three steps:

1. Bringing the surface to be metallized into a state in which it is capable of adsorbing a molecular layer of ions;

2. Causing a molecular layer of ions to be adsorbed on the surface thus prepared, by immersing it into an alkaline solution of a metallic salt, and by freeing it then from any excess of ions (for instance by washing with distilled water), so that the surface, which remains merely covered by a molecular layer of ions adhering strongly thereto, owing to the adsorption forces, is ready for the third step;

3. Performing upon the ionic layer which has just been obtained the metallic deposit proper. As a matter of fact, the preceding preparation of the surface has given the remarkable result of rendering said surface capable of receiving in adhering and satisfactory manner any metallic deposit formed by treating said surface by the known and usual solutions, such as those currently employed for silvering and gilding looking glasses. But, in a general manner, and for the whole of the matters above mentioned, this metallization can be performed, according to the present invention and in an advantageous manner, through a new method which consists in pouring a solution containing, together with a ferrous salt and an hydroxy-acid, the alkaline solution of a salt of the metal to be deposited, this last mentioned solution having been brought, through a preliminary treatment, to the lowest possible state of oxidation.

In the case of metallic surfaces, and also in that of glass, ceramic matters, or mica, the first part of the method consists in scouring, cleaning, and freeing from any traces of oxides the surface to be metallized, according to the known processes, and preferably keeping, subsequently, the surface in contact with pure water.

In the case of the other surfaces, constituted by an organic matter and which are capable of admitting, under certain circumstances, a certain degree of imbibition, the first step of the method consists in an imbibition of the surface intended to permit a penetration of the layer of ions produced in the second part of the treatment and to improve the adhesion of the final metallic deposit. This imbibition is carried out by passing the matter to be treated through one or several successive baths, consisting, in a general manner, of an aqueous solution of a solvent of this matter. This solvent may be either a mineral salt, such as zinc chloride, cupro-ammoniacal solutions, or the like, or an alcohol, aldehyde, ketone, organic acid, etc., that is to say any body mixable either wholly or partly with water and having also the property of dissolving more or less in the matter that is treated. It is an essential condition that the solvent should be exempt from any reducing action on the metallic solutions employed in the second and third steps of the method. For instance, in the case of cellulose acetate, it is necessary to make use of quinone, and not hydroquinone, because the last mentioned body, which might also imbibe cellulose acetate, would at the same time give it reducing properties, which would prevent the subsequent formation of an adhering metallic deposit under the conditions of the method. When it is desired to treat a film of cellulose acetate for instance, it is left for some minutes in a solution of quinone preferably of a concentration of from 10 to 15 grams per thousand grams of water, and, after washing, it is immersed for some minutes into a cupro-ammoniacal bath, containing for instance one quarter of a molecule of $Cu(OH)_2$ and 2 molecules of $NH_4OH$ per liter. It is clear that the choice and the concentration of these baths depend upon the nature of the matter to be treated and that the duration of the treatment can be varied at will by modifying either the concentration or the temperature of the baths.

The second part of the method is a purely ionic treatment and it serves merely to bring the surface to be metallized into a particular physicochemical state, that of metallic colloid ions, characterized by a negative polarity and a suitable electric charge. This treatment, which is necessary for the subsequent obtainment of an even and adhesive metal deposit, consists in treating the surface to be metallized with an alkaline solution of a metallic salt. This solution may consist: either of an alkaline solution of the ion that will be deposited in the subsequent metallization, or, preferably, and this whatever be the nature of the metal that will be subsequently deposited (case of the metallization by antimony, for instance) of a highly diluted solution of gold, platinum, or silver hydrate. In this latter case, it is advantageous to perform a preliminary washing of the surface with a stannous solution, followed by an abundant washing with water. The contact of the surface with the solution of gold, platinum or silver hydrate lasts for some seconds (for instance from 30 to 90 seconds), this period of time being sufficient for forming the adsorption layer. This treatment is always followed by a treatment intended to remove any excess of ions, for instance by washing with distilled water. At this time, the layer of ions covering the surface of the glass is characterized by its very small thickness, which averages the dimensions of the molecule (that is to say from $10^{-7}$ to $10^{-8}$ centimeters). Therefore this layer has no reflecting power and it will have no effect in the appearance of the subsequent metallization. Furthermore, this layer has not a sufficient conductivity for the possible obtainment of a galvanic deposit. Finally, the cost of the metal that is employed is negligible since a molecule-gramme (of gold for instance) is theoretically sufficient for forming a monomolecular layer of adsorption over an area of 40 hectares; for depositing for instance a layer of gold ions, I employ a pure solution of auric hydrate containing about 1/1000 of a molecule-gramme of gold per litre.

The third step of the process consists in the metallization of the surface thus prepared. A particularly advantageous way of performing this operation, according to the invention, consists in pouring as a whole onto the surface thus prepared a solution containing together with a ferrous salt and in the presence of an hydroxy-acid the alkaline solution of a salt of the metal to be deposited, this last mentioned solution having been brought, through a suitable treatment, into the lowest possible state of oxidation, and this preferably by means of a hydrosulfite or its formaldehyde derivatives, or of a ferrous salt.

In order to reinforce the layer of metal which has just been formed in the course of the third step of the treatment, I may, after having left the metallization solution for a certain time on the surface to be metallized, allow it to drip without rinsing, then cause a new metallization solution identical to the first one to act for the same period of time, and finally rinse with water.

By way of non-limitative example, I will now describe an embodiment of the invention for the gilding of copper, for depositing metallic antimony on glass and for silvering and coppering a film of cellulose acetate.

In order to gild a surface of copper, the surface is cleaned with benzine, then immersed for some minutes in a dilute solution of stannous chloride. After washing, the surface is immersed in a solution of silver hydrate of thousandth-molecular concentration. After washing, the surface is left in a bath constituted by:

| | Grams per 1000 |
|---|---|
| AuO₃Na₃ | 2 |
| Glucose | 0.25 |
| Levulose | 0.25 |
| Sodium tartrate | 0.025 | at a temperature kept between 40 and 50° C.

After drying, the gold deposit is capable of receiving a fine polish under the action of a soft leather.

In order to form a deposit of bright metallic antimony on glass, I make use of a metallization solution prepared in the following manner (quantity corresponding to the metallization of an area of 100 square centimeters); adding successively:

| | | |
|---|---|---|
| Solution of antimony trichloride D⁰ 1.38 | cm.³ | 6 |
| Tartaric acid, 15 gr. <br> NaOH (big grains), 12 gr. <br> NH₄OH of 20 per cent 40 cm.³ <br> Water q. s., 250 cm.³ | cm.³ | 24 |
| Rongalite, 153 cm.³ <br> Water q. s., 1000 cm.³ | cm.³ | 27 |
| Mohr salt (ammoniacal ferrous sulfate), 255.48 gr. <br> Commercial formaldehyde of 35 per cent, 65.17 cm.³ <br> Water q. s., 1000 cm.³ | cm.³ | 30 |

This metallization solution is poured onto the glass surface which will have undergone, in the meantime, the treatments above mentioned for forming the ionic layer.

For this purpose, the glass surface has been perfectly cleaned according to the known processes (for instance by means of rouge and then with diluted hydrofluoric acid). It is then left for some minutes in contact with a dilute solution of stannous chloride then washed with distilled water. The glass surface is then brought into contact with a solution of thousandth-molecular gold hydrate (for 90 seconds). I wash with distilled water. The glass surface, which is now provided with its ionic layer is finally brought into contact with the metallization solution. In the particular case of metallization by means of antimony, it is advisable to gradually raise the temperature. A short time before boiling takes place, the deposit of antimony becomes apparent, coating the glass surface with an adhesive and thick dazzling layer of metallic antimony, whereas the solution remains clear.

It should be noted that if the same metallization solution had been brought into contact, under the same conditions, with any glass surface perfectly clean but not having undergone the ionic treatment according to the present invention as above explained, the glass surface would not have been metallized, the solution being clouded by the production of antimony muds. Carried out on a test tube, the metallization according to the present invention permits of manufacturing antimony electrodes for measuring the pH in a very easy manner.

In the case of the silvering of a film of cellulose acetate, the film is first treated for ensuring that it is perfectly clean.

The film is immersed at a temperature of 25° for five minutes in a solution of quinone of fifteen grams per thousand grams of water. After washing with ordinary water, the film is immersed, for five minutes, in a solution containing one quarter of a molecule of Cu(OH)₂ and two molecules of NH₄OH, at a temperature of 25°.

After washing in ordinary water, and then in distilled water, the film is immersed into a stannous solution corresponding to one tenth of a molecule (advantageously, I may add to this solution about five per thousand of one of the bodies above referred to as capable of facilitating imbibition, preferably phenol in this case), washed, immersed into a solution of auric hydrate of $$\frac{N}{1000}$$

and washed with distilled water. Attention is called to the fact that, at this time, the film has no reducing property of its own. Its surface is then merely prepared from a physico-chemical point of view, and is immediately covered with an adhesive deposit of silver as soon as it is immersed in the metallization bath, the composition of which is analogous to that of baths utilised for silvering looking glasses (for instance ammoniacal silver hydrate and glucose).

If, instead of silvering a film it is desired to coat it with copper, the silver metallization bath is replaced by the following solution:

| | | |
|---|---|---|
| Tartaric acid | gr | 1.08 |
| NaOH | gr | 0.9 |
| Crystallised copper sulphate | gr | 3.24 |
| Ammonia (20%) | cm.³ | 3 |
| Rongalite (formaldehyde-hydrosulfite) | gr | 0.99 |
| Ammoniacal iron sulphate (Mohr's salt) | gr | 2.93 |
| Commercial formol | cm.³ | 0.747 |
| Water q. s. for | cm.³ | 36 |

The solution is allowed to act for about fifteen minutes at the ordinary temperature, to wit for instance from 20 to 25° C.; then I wash abundantly and I dry.

The accompanying drawing is an enlarged and diagrammatic sectional view of a metallized article obtained through the method according to the present invention, 1 being the material to be metallized, 2 the ion molecular layer, and 3 the deposite of metal.

The relative thickness shown on the drawing for the layers of the different materials is far from what it is in reality, as, for example, the thickness of the layer 2 runs around $10^{-7}$ cm. whereas the plate 1 has at least several tenths of a millimeter.

In a general manner, while I have, in the above description, disclosed what I deem to be practical and efficient examples of the method according to the present invention, it should be well understood that I do not wish to be limited thereto as there might be changes made therein without departing from the principle of the present invention.

What I claim is:

1. A method of treating the surface of materials for forming thereon, through a wet method and in the absence of an external electric source, a highly adhesive deposit of a metal, the electrolytic potential of which is positive with respect to hydrogen in the electromotive series, which method comprises conditioning said surface for rendering it adsorbent to a molecular layer of ions, applying said layer through contact with an alkaline solution of a metallic ion having a positive electrolytic potential with respect to hydrogen in the electromotive series, removing any excess of ions by abundantly washing said surface, and immediately metallizing the surface thus prepared by means of a solution containing simultaneously with a ferrous salt and an hydroxy acid the solution of a salt of the metal to be deposited, this last mentioned solution having been brought to the state of minimum oxidation.

2. A method of treating the surface of materials for forming thereon, through a wet method and in the absence of an external electric source, a highly adhesive deposit of a metal, the electrolytic potential of which is positive with respect to hydrogen in the electromotive series, which method comprises conditioning said surface for rendering it adsorbent to a molecular layer of ions, applying the molecular layer of ions to the surface by washing with a stannous solution and then by treating with a very dilute solution of a hydrate of a metal selected from the group consisting of gold, platinum and silver, removing the excess of the last mentioned reagents by washing between the respective operations, and then metallizing the surface thus prepared with a metallizing composite solution containing together with a ferrous salt and in the presence of an hydroxy acid, the alkaline solution of a salt of the metal to be deposited, this composite solution being in the state of minimum oxidation.

JEAN LOISELEUR.